(12) United States Patent
Hinrichs et al.

(10) Patent No.: US 6,775,767 B2
(45) Date of Patent: Aug. 10, 2004

(54) METHOD FOR AUTOMATICALLY ASSIGNING ADDRESSES TO THE PARTICIPATING UNITS OF A BUS SYSTEM

(75) Inventors: Knut Hinrichs, Glueckstadt (DE); Erhard Müsch, Werne (DE)

(73) Assignee: Elmos Semiconductor AG, Dortmund (DE)

( * ) Notice: Subject to any disclaimer, the term of this patent is extended or adjusted under 35 U.S.C. 154(b) by 659 days.

(21) Appl. No.: 09/836,228

(22) Filed: Apr. 18, 2001

(65) Prior Publication Data

US 2001/0044860 A1 Nov. 22, 2001

(30) Foreign Application Priority Data

Apr. 18, 2000 (EP) ............................................. 00108429
Oct. 20, 2000 (DE) ......................................... 100 52 044

(51) Int. Cl.[7] ......................................... G06F 15/177
(52) U.S. Cl. ............................... 713/1; 700/19; 700/24
(58) Field of Search ............................... 713/1, 2, 100; 700/19, 24, 56, 57, 64, 170; 710/3, 4, 104

(56) References Cited

U.S. PATENT DOCUMENTS

| | | | |
|---|---|---|---|
| 6,249,711 B1 * | 6/2001 | Aart ............................. | 700/19 |
| 6,446,202 B1 * | 9/2002 | Krivoshein et al. ............ | 713/1 |
| 6,449,715 B1 * | 9/2002 | Krivoshein .................... | 713/1 |
| 6,622,053 B1 * | 9/2003 | Hewlett et al. ............... | 700/19 |

* cited by examiner

Primary Examiner—Dennis M. Butler
(74) Attorney, Agent, or Firm—Birch, Stewart, Kolasch & Birch, LLP

(57) ABSTRACT

A method for automatically assigning addresses in a bus system with a bus, a plurality of participating units connected to the bus and a control device for issuing control signals to the units also coupled to the bus, where each unit comprises an actuator and an actuator driving device for displacing the actuator along a displacement path defined by two end positions, is characterized by the following steps: storing, in the control device, operating data sets that, upon adjustment of the actuators from one end position to another end position, describe expected operation parameters of the actuator driving devices of the units, these set parameters being different for each actuator driving device, and storing address data that are also different and are assigned to the different set parameters; the control device causes the actuator driving devices of the units to move the respective assigned actuators to the one end position; the control device then causes the actuator driving devices of the units to move the respective assigned actuators to the other end position; determining the actual operating parameters of the actuator driving devices during the movement of the actuators of the units from one end position to the other end position; the control device issues the set parameters and the respective assigned address data to all units; each unit compares the actual operating parameters to the set operating parameters provided by the control device and assumes those address data as its address in the bus system, which belong to those set operating parameters to which the actual operating parameters of its actuator driving device correspond.

9 Claims, 2 Drawing Sheets

METHOD FOR AUTOMATICALLY ASSIGNING ADDRESSES TO THE PARTICIPATING UNITS OF A BUS SYSTEM

TECHNICAL FIELD

The present invention refers to a method for automatically assigning addresses in a bus system with a single or multiple wire bus, a plurality of participating units (referred to as units in the following) connected to the bus and a control device for issuing control signals to the units, the control device also being coupled to the bus, where each unit comprises an actuator and an actuator driving device for displacing the actuator along a displacement path defined by two end positions.

BACKGROUND OF THE INVENTION

In order to minimize wiring efforts in automotive vehicles, for example, control signals for controlling actuators are more and more frequently sent via a bus to which, besides a control device, also the controlling devices for the actuator driving devices of the individual units are coupled. The actuator driving devices of a vehicle air conditioning, window lifters or the front seats, for example, are comprised in a bus system. To enable the control device to selectively control one or a plurality of actuator drives, addresses are assigned to these. At present, the addresses of units are stored by programming. While this procedure is relatively unproblematic during the assembly of a vehicle, the efforts required are all the greater if the entire unit, i.e. the actuator driving device including the control, has to be replaced in a garage, for example, since the garage has to be equipped with a corresponding programming device.

SUMMARY OF THE INVENTION

It is the object of the present invention to simplify the assigning of addresses in a bus system with a control device and a plurality of units with actuator driving devices and the necessary controlling devices.

The object is solved by the present invention with a method for a system of the kind mentioned above, the method comprising the following steps:

storing, in the control device, operating data sets that, upon adjustment of the actuators from one end position to another end position, describe expected operation parameters of the actuator driving devices of the units, these set parameters being different for each actuator driving device, and storing address data that are also different and are assigned to the different set parameters, wherein the control device causes the actuator driving devices of the units to move the respective assigned actuators to the one end position, wherein the control device then causes the actuator driving devices of the units to move the respective assigned actuators to the other end position, determining the actual operating parameters of the actuator driving devices during the movement of the actuators of the units from one end position to the other end position, wherein the control device issues the set parameters and the respective assigned address data to all units, wherein each unit compares the actual operating parameters to the set operating parameters provided by the control device and accepts those address data as its address in the bus system, which belong to those set operating parameters to which the actual operating parameters of its actuator driving device correspond.

The present invention takes advantage of the fact that the address is assigned depending on the operating parameters of the actuator driving devices that occur when the actuator driving devices displace their respective assigned actuators from one end position to the other end position. The set parameters to be expected have been established with consideration to the given circumstances and the production tolerances and have been stored in the control device together with their assigned addresses. In an alternative variant of the invention, all set operating parameters to be expected are stored in each unit together with the respective assigned addresses.

Using the actual operating parameters resulting from the displacement of the actuators from the one end position to the other, each unit can be individualized by comparing the set operating parameters to the actual operating parameters and determining within which set operating parameters the actual operating parameters of the units fall. Thus, the control device can assign an address to each unit, or each unit assigns an address to himself.

The present invention becomes particularly transparent if the displacement path along which the actuator moved by an actuator driving device can be displaced, is defined as an operating parameter. If no other values are considered besides the displacement paths to define the operating parameters, a unique assignment of an address to a unit requires that the displacement paths of the units are different. In this case, also the ranges of the displacement paths (set operating parameters) must be different which, as is assumed in the present case, are stored in the control device together with the addresses assigned to them. In response to a central command from the control device, the actuators of all units are moved to the one end position. Upon another central command from the control device, all actuators are moved to the other end position. In the process, the units determine the actual displacement. This may be done, for example, by a revertive potentiometer as is the case, for example, in an actuator driving device with position control, or by counting the steps of a stepper motor. In any case, the actual displacement paths are stored in the units after displacement of their actuators from the one end position to the other end position.

Then, the control device issues data word pairs. These data word pairs consist of data, on the one hand, representing the set displacement path ranges of the individual actuators in consideration of potential tolerances, and of address data, on the other hand. The individual units now check in which of the set displacement path regions the previously determined actual displacement path ranges of their actuators fall. They accept those address data that are assigned to the set displacement path ranges within which the actual displacement paths of their actuators lie. In this manner, each unit is accorded a unique address.

The above described method of using the displacement paths of the individual actuators as operating parameters is applicable whenever the displacement paths of the actuators of bus system units differ sufficiently, even in consideration of tolerances, so that a unique assignment of addresses to units can be made on the basis of the actual displacement paths. However, bus systems exist, where the actuators of two or more units have the same or substantially the same displacement paths. Exemplary for such bus systems are the actuator driving devices of the air distributing flaps and the heating and cooling fluid of a heat and cold exchanger in a vehicle air condition, where different set temperatures may be set by the driver and the co-driver (so-called left/right air conditioning systems). These systems may have a "symmetrical" design where each component is provided twice, i.e. once for the driver and once for the co-driver. In such a bus system, there are always two units whose actuators can travel the same displacement path between their respective end positions (in consideration of production and assembly tolerances, of course).

A first possibility to have addresses assigned according to the present method also in such systems is to make the pairs of equal displacement paths different by structural means. This is possible without the two subsystems reacting or operating such that the passengers of the vehicle could sense the difference.

Another possibility is to use different operating voltage polarization for the units of each unit pair having actuator driving devices with actuators having the same displacement path. The operating voltage is a DC voltage so that the different polarization would cause the actuators to be displaced in opposite directions if those units are controlled in the same way. By connecting a diode full bridge between the DC power supply and the actuator driving devices, the operating voltage at the actuator driving devices has the same polarization for all actuator driving devices. By tapping one of the input terminals of the diode full bridge, the polarization of the unit with the DC power supply can be detected. Besides the data for the set displacement path ranges, the kind of polarization is further stored as a set operating parameter. Address data are assigned to these data sets so that, despite identical displacement paths, a difference can be made between two units or two actuator driving devices having the same displacement path, thereby again obtaining a unique address assignment.

Besides the length of the displacement paths and/or the polarization of the actuator driving devices with the DC power supply, the operating parameters can additionally and/or alternatively also represent the size and/or the course in time of the currents flowing through the actuator driving devices during the displacement from the one end position to the other. In particular the variation of the current with time upon reaching the end positions may be employed to create a distinction between the two units of each pair in a system where pairs of the actuators of each unit have almost identical displacement paths. This is possible in particular with a "symmetrically" arranged system with actuators adjusting flaps such as in a vehicle air condition system where the temperature may be set individually on the driver's and the co-driver's side. The air distributing and temperature mixing flaps of such a system are provided with a sealing to close substantially tightly in one end position (CLOSED position). The stop is relatively "soft" in this end position, whereas the other stop is "harder". When the two mutually symmetrical flaps that are displaced by the actuator driving devices of the two units in a pair are moved from the one end position to the other, the current flow for one flap is different from that of the other flap near the end of the displacement path, while the displacement path is substantially the same. When assigning addresses at a later time, this can be used to make a distinction between the two units whose two flaps have substantially the same displacement path.

Similarly, the magnitude of the current can be employed to distinct between two units whose actuators travel substantially the same displacement path. This is used, for example, in all cases where the actuator is biased by mechanical spring force towards the one of the two end positions. When being moved from the one to the other end position, one of the two symmetrically arranged flaps acts against the spring force, whereas the movement of the other flap is supported by the spring force.

The previously described possibilities of making a distinction between two units of a bus system by the amount of current consumption and the variation of the current with time can be used wherever the mechanical connection between an actuator and the actuator driving device assigned thereto is symmetrical. With respect to the actuators, the actuator driving devices are on different sides of the actuators. As long as this is given, such as in the air supply channel system of a left/right air condition system of a vehicle, there are possibilities to make a distinction between the units despite the pairs of substantially equal displacement paths of the actuators, namely, by using the operating parameters. This is different, however, for pairs of alternate polarization of the actuator driving devices of the units of a bus system. Here, a "symmetrical" design of the coupling between the actuator driving devices and the actuators is not necessary.

BRIEF DESCRIPTION OF THE DRAWING

The present invention will now be described in more detail with reference to the accompanying drawing. In the figures:

FIG. 1 illustrates a bus system 10 according to a first embodiment of the present invention. The bus system 10 comprises a DC power supply device 12 supplying DC to a voltage network 14. Connected to this voltage supply network 14 are a plurality of units 16, 18, 20 and 22, as well as a control device 24. The control device 24 issues control signals to the individual units 16 to 22 on a single or multiple wire bus 26.

Figure 1:
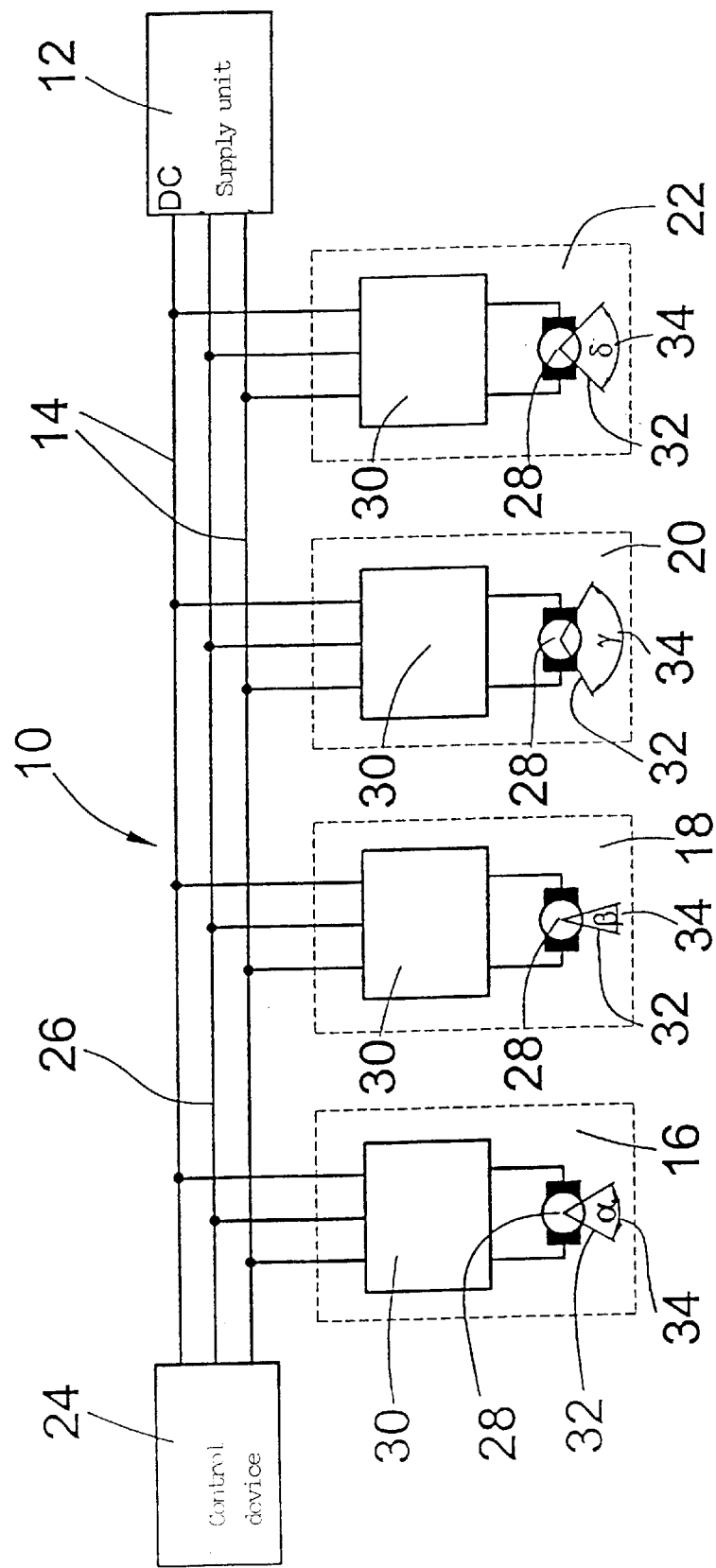
FIG. 1 illustrates a bus system with a control device and a voltage supply as well as a plurality of units with a respective actuator driving device for an actuator and control electronics for the actuator driving device, the actuators being adapted to be displaced between to end positions along two displacement paths of different length.

Each unit 16 to 22 is provided with an actuator driving device in the form of an electric motor 28 and a control circuit 30 for the electric motor 28. In the example illustrated, the electric motor 28 pivots an actuator in the form of a flap 32. Such a bus system 20 exists, for example, in a vehicle air condition system, where the actuators are the temperature mixing and air distributing flaps.

The electric motors 28 are stepper motors. These stepper motors adjust the flaps 32 between two end positions. In FIG. 1, one end position of each flap 32 is shown as a continuous line, while the other is shown as a broken line. The displacement paths 34 defined by these two end positions are of different length, indicated in FIG. 1 by the letters $\alpha$, $\beta$, $\gamma$ and $\delta$.

The control circuits 30 of all units 16 to 22 are identical. In order to address these control circuits 30 individually, different addresses must be assigned to the units 16 to 22. The assignment of addresses is done automatically in dependence on the length of the displacement paths 34 of the flaps 32 of the units 16 to 22. The operation is as follows.

Due to the structural features of the overall mechanical system into which the units 16 to 22 are integrated with their flaps 30, the displacement paths 34 of the flaps are of different lengths. Taking the tolerances ε into consideration, portions of the displacement paths can be defined. Addresses are assigned to these displacement path portions. The displacement path portions and the addresses are stored in pairs in the control device 24.

In the beginning of the address assignment a central command from the control device 24 controls all units 16 to 22 such that their electric motors 28 move the flaps 32 to one of the two end positions. The control circuit 30 detects the arrival at the end position, or the arrival is reported back to the control device 24 and detected there. Then, the control device 24 issues a further central command causing the flaps 32 of all units 16 to 22 to be moved to the other end position. The respective displacement paths 34 traveled are measured or otherwise detected in the units 16 to 22. When the electric motors are stepper motors, as in the present example, the individual steps may be counted. If the electric motors 28 or the flaps 32 have path sensors in the form of potentiometers, for example, the increases in the voltage between the two end positions can be measured. After the displacement of its flap 32 from the one end position to the other, each unit 16 to 22 "knows" which displacement path its flap 32 has traveled. Thereafter, the control unit 24 issues the displacement path portions and address pairs mentioned in the table below.

TABLE 1

| Displacement path portion | Address | Unit |
|---|---|---|
| α − ε, α + ε | ADDRESS 1 | 16 |
| β − ε, β + ε | ADDRESS 2 | 18 |
| — | — | — |
| — | — | — |
| — | — | — |
| γ − ε, γ + ε | ADDRESS n−1 | 20 |
| δ − ε, δ − ε | ADDRESS n | 22 |

The control circuit 30 of each unit 16 to 22 then executes a comparison, checking for each unit 16 to 22, within which displacement path portion the actual detected displacement path of the flap 32 lies. Thereafter, the address assigned to this displacement path portion is accepted by the respective unit as its address. Thus, the address assignment is completed.

For reasons of security, one should make sure that each unit is actually given an address. In this respect, it is advantageous if each unit 16 to 22 supplies a report signal to the control device 24 after having accepted an address. The control unit itself may issue an error indication, if more than one unit reports the acceptance of the same address or if at least one unit provides no report signal. It is also possible that those units that could not accept an address respectively provide an error indication.

In the first embodiment of the invention described with reference to FIG. 1, the selection of different lengths of the displacement paths 34 guarantees that each unit 16 to 22 can be individualized. When the present method is to be used in a bus system, where two units have actuators with displacement paths of substantially the same length, additional information is required besides the magnitude of the displacement path to uniquely assign addresses to the units of a pair having the same actuator displacement path lengths. The embodiment of FIG. 2 illustrates how this additional information can be obtained through the detection of the polarization of the units with the voltage supply network.

Figure 2:
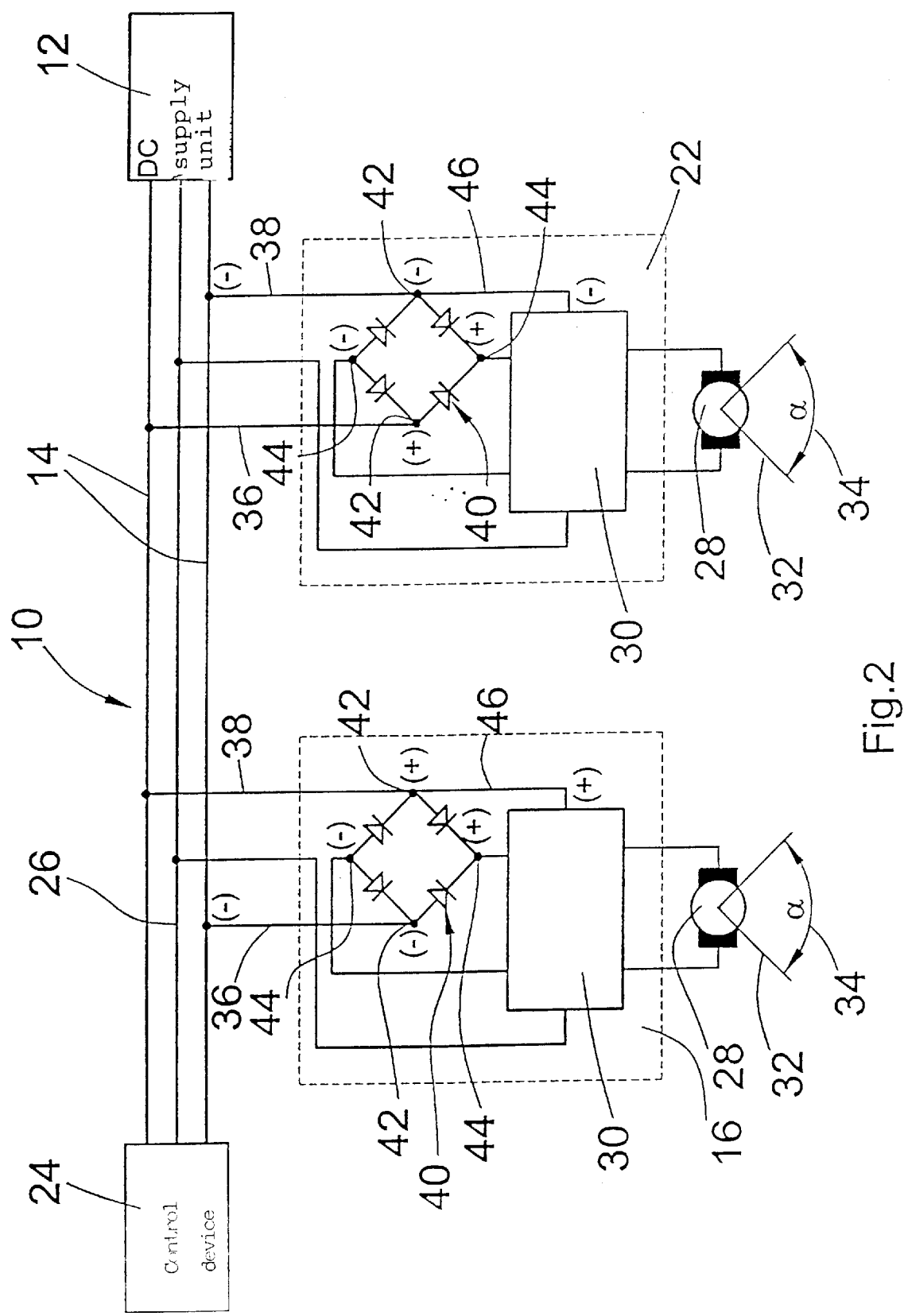
FIG. 2 illustrates a bus system with a control device and supply voltage, as well as a plurality of units, each having an actuator driving device with control electronics and an actuator, the actuators being adapted to be displaced in pairs along substantially equal displacement paths between two end positions.

FIG. 2 illustrates a bus system 10', wherein only two of a plurality of units are shown for the sake of simplicity. As far as the details of the bus system 10' correspond to those of the bus system 10 of FIG. 1, they have been accorded the same reference numerals in FIG. 2.

Other than in the bus system 10, where all units 16 to 22 are connected to the voltage supply network 14 in the same manner (same polarization), in the bus system 10' of FIG. 2, the two units 16, 22, whose actuators in the form of flaps 32 can travel a displacement path 34 of equal length, are connected to the voltage supply network 14 in different ways. The terminal 36 of unit 16 is connected to negative or ground potential of the supply network 14, while the terminal 36 of the unit 22 is connected to positive potential.

The terminal 38 of the unit 16 is connected to positive potential, while the terminal 38 of the unit 22 is connected to negative or ground potential of the supply network 14. To prevent this differing polarization from causing the flaps 32 of the units 16, 22 to be displaced in different directions when the units 16, 22 are controlled in the same manner by the control device 24, a rectifier 40 is connected in series to the electric motors 29 and the control circuits 30, respectively, the rectifier being a full bridge with diodes or switched transistors, as illustrated in FIG. 2. The input terminals 42 of the rectifiers 40 have the voltage of the voltage supply network 14 applied thereto, while the output terminals 44 are connected to the control circuits 30. The rectifiers 40 thus cause the control circuits 30, and thereby also the electric motors 28 of the two units 16, 22, to be coupled with the same polarization.

At the tap 46 of one of the two input terminals 42, it can then be detected in which way the respective units 16, 22 are connected with the voltage supply net 14. Thus, the polarization and the tap 46 provide a criterion for the distinction between the two units 16, 22 so as to assign different addresses to these two units whose flaps 32 travel the same displacement paths 34 between the two end positions.

In the beginning of the address assignment, the central control of the units 16, 22 for displacing the flaps 32 in the one end position and for displacing the flaps 32 from this end position to the other end position is as described above. After the displacement of the flaps 32 from the one end position to the other, both units 16, 22 have detected equal or substantially equal displacement path lengths 34 for their flaps 32. Through the tap 46, each unit 16, 22 "knows" in which way it is connected to the voltage supply net 14. The control device 24 then issues addresses besides the displacement path portions—determined with consideration to tolerances—and the polarization and reports these data sets to the individual units 16, 22. These data sets are obvious from the following table 2.

TABLE 2

| Displacement path portion/polarization | Address | Unit |
|---|---|---|
| α − ε, α + ε; (+) | ADDRESS 1 | 16 |
| — | — | — |
| — | — | — |
| α − ε, α − ε; (−) | ADDRESS n | 22 |

Each unit 16, 22 again compares the displacement path portion reported by the control unit 24 and the polarization to the previously determined displacement path portion and its own polarization so as to be able to clearly determine from this information which address has been assigned to it. The unit 16, 22 accepts this address as its address in the bus system 10'.

The present invention has been described using the embodiment of a bus system, whose participating units have actuators, the distinction between the units being made by the operating parameters describing their function. For example, such units of a bus system could be specified in a distinctive manner by their electrical values in the (single) operating condition, in at least one of the operating conditions and/or during the switching from one to the other operating condition. Electric characteristics or their course over time are, for example:

the current consumption, the resistance, the capacitance, and/or the output voltage/current of a sensor.

What is claimed is:

1. A method for automatically assigning addresses in a bus system with a bus, a plurality of participating units connected to the bus and a control device for issuing control signals to the units also coupled to the bus, where each unit comprises an actuator and an actuator driving device for displacing the actuator along a displacement path defined by two end positions, comprising the following steps:

storing, in the control device, operating data sets that, upon adjustment of the actuators from one end position to another end position, describe expected operation parameters of the actuator driving devices of the units, these set parameters being different for each actuator driving device, and storing address data that are also different and are assigned to the different set parameters, wherein the control device causes the actuator driving devices of the units to move the respective assigned actuators to the one end position, wherein the control device then causes the actuator driving devices of the units to move the respective assigned actuators to the other end position, determining the actual operating parameters of the actuator driving devices during the movement of the actuators of the units from one end position to the other end position, wherein the control device issues the set parameters and the respective assigned address data to all units, wherein each unit compares the actual operating parameters to the set operating parameters provided by the control device and accepts those address data as its address in the bus system, which belong to those set operating parameters to which the actual operating parameters of its actuator driving device correspond.

2. A method for automatically assigning addresses in a bus system with a bus, a plurality of participating units connected to the bus and a control device for issuing control signals to the units also coupled to the bus, where each unit comprises an actuator and an actuator driving device for displacing the actuator along a displacement path defined by two end positions, comprising the following steps:

storing, in each unit, operating data sets that for all units, upon adjustment of the actuators from one end position to another end position, describe expected operation parameters of the actuator driving devices of the units, these set parameters being different for each actuator driving device, and storing address data that are also different and are assigned to the different set parameters, wherein the control device causes the actuator driving devices of the units to move the respective assigned actuators to the one end position, wherein the control device then causes the actuator driving devices of the units to move the respective assigned actuators to the other end position, determining the actual operating parameters of the actuator driving devices during the movement of the actuators of the units from one end position to the other end position, wherein each unit compares the actual operating parameters to the set operating parameters provided by the control device and accepts those address data as its address in the bus system, which belong to those set operating parameters to which the actual operating parameters of its actuator driving device correspond.

3. The method of claim 1 or 2, wherein each unit issues an acknowledgment to the control device after having accepted address data.

4. The method of claim 3, wherein the control device issues an error indication if more than one unit acknowledges the acceptance of the same address data or if at least one unit has provided no acknowledgment.

5. The method of claim 2, wherein a unit issues an error indication, if it could not accept any address data.

6. The method of claim 2 or 5, wherein each unit reports the address data accepted to the control device, and wherein the control device issues an error indication if more than one unit acknowledges the acceptance of the same address data or if at least one unit has provided no acknowledgment.

7. The method of claim 1, wherein the set operating parameters off the actuator driving devices represent the length of the displacement paths of the actuators.

8. The method of claim 1, wherein the set operating parameters of the actuator driving devices represent the magnitude and/or the course over time of the currents flowing through the actuator driving devices upon displacement from the one position to the other position.

9. The method of claim 1, wherein the set operating parameters represent the kind of polarization of the actuator driving device with a DC supply network.

* * * * *